(12) United States Patent
Joubert et al.

(10) Patent No.: US 10,150,570 B2
(45) Date of Patent: Dec. 11, 2018

(54) DEVICE AND METHOD FOR COOLING AT LEAST ONE AUTONOMOUS ELECTRIC POWER SOURCE OF AN AIRCRAFT

(71) Applicant: AIRBUS SAS, Blagnac (FR)

(72) Inventors: Emmanuel Joubert, Issy les Moulineaux (FR); Benoit Ferran, Paris (FR); Antonin Sanitas, Sollies-Pont (FR)

(73) Assignee: Airbus SAS, Blagnac (FR)

( * ) Notice: Subject to any disclaimer, the term of this patent is extended or adjusted under 35 U.S.C. 154(b) by 313 days.

(21) Appl. No.: 14/965,926

(22) Filed: Dec. 11, 2015

(65) Prior Publication Data

US 2016/0167800 A1 Jun. 16, 2016

(30) Foreign Application Priority Data

Dec. 12, 2014 (EP) .................................. 14307019

(51) Int. Cl.
| | |
|---|---|
| B64D 33/08 | (2006.01) |
| H01M 10/625 | (2014.01) |
| H01M 10/6563 | (2014.01) |
| B64D 27/24 | (2006.01) |
| B64D 33/10 | (2006.01) |

(52) U.S. Cl.
CPC ............ B64D 33/08 (2013.01); B64D 27/24 (2013.01); H01M 10/625 (2015.04); H01M 10/6563 (2015.04); *B64D 33/10* (2013.01); *H01M 2220/20* (2013.01)

(58) Field of Classification Search
CPC .. B64D 33/08; H01M 10/625; H01M 10/6563
See application file for complete search history.

(56) References Cited

U.S. PATENT DOCUMENTS

| | | | |
|---|---|---|---|
| 8,608,106 B2 | 12/2013 | Baumgardt et al. | |
| 8,794,571 B2 | 8/2014 | Baumgardt et al. | |
| 2009/0120702 A1* | 5/2009 | Yoda ....................... | B60R 16/04 180/68.1 |

(Continued)

FOREIGN PATENT DOCUMENTS

| | | |
|---|---|---|
| DE | 102009013159 | 9/2010 |
| DE | 102011015126 | 9/2012 |

(Continued)

OTHER PUBLICATIONS

European Search Report dated Jun. 8, 2015; Application No. 14307019.1.

*Primary Examiner* — Nicholas McFall
(74) *Attorney, Agent, or Firm* — Greer, Burns & Crain, Ltd.

(57) ABSTRACT

A device for cooling at least one autonomous electric power source of an aircraft, includes: an inlet for air cooling a cooling fluid; the cooling fluid being fed towards at least one autonomous electric power source of the aircraft; a convergent hot air outlet, including moving elements for controlling the air flowrate; and supervision elements of the aircraft, which control the moving elements for controlling the air flowrate depending on the need for cooling of the autonomous electric power source. A method for cooling at least one autonomous electric power source of an aircraft and an aircraft including such a device are also described.

20 Claims, 4 Drawing Sheets

(56) References Cited

U.S. PATENT DOCUMENTS

| | | | |
|---|---|---|---|
| 2011/0017426 A1 | 1/2011 | Baumgardt et al. | |
| 2012/0160445 A1* | 6/2012 | Baumgardt | B64C 1/26 |
| | | | 165/41 |
| 2013/0017419 A1* | 1/2013 | Jin | H01M 10/425 |
| | | | 429/50 |
| 2014/0023479 A1 | 1/2014 | Stolte et al. | |
| 2014/0208761 A1* | 7/2014 | Skilton | B64D 33/08 |
| | | | 60/772 |
| 2015/0232191 A1* | 8/2015 | Wetzel | B64D 33/08 |
| | | | 244/53 R |

FOREIGN PATENT DOCUMENTS

| | | |
|---|---|---|
| DE | 102012217469 | 3/2014 |
| WO | 2009080168 | 7/2009 |

\* cited by examiner

DEVICE AND METHOD FOR COOLING AT LEAST ONE AUTONOMOUS ELECTRIC POWER SOURCE OF AN AIRCRAFT

FIELD OF THE INVENTION

The present invention relates to a device and a method for cooling at least one autonomous electric power source of an aircraft and to an aircraft comprising such a device.

The present invention applies to the field of aeronautics. More specifically, the present invention applies to electric or hybrid aircraft comprising autonomous electric power sources.

PRIOR ART

Electric or hybrid aircraft require on-board autonomous electric power sources. The service life of the autonomous electric power sources has an effect on the operating costs of such aircraft. The cycling and the performance of the autonomous electric power sources depend on various factors, in particular the operating temperatures during the charging and discharging phases. In the automotive field, systems for cooling wet batteries are mainly used. However, these systems have the drawback of having a high mass and of being difficult to adapt to aircraft. Moreover, the cooling systems incorporate fans that are started up during the recharging phase when the vehicle is stopped. However, the volume and the mass represented by these fans have an impact on the autonomy of the vehicle, thereby preventing adaptation of such a device to an aircraft.

Finally, the existing electric and hybrid aeroplanes are mainly prototypes, the great majority of which do not have active control of the temperature of the autonomous electric power sources. Most of the prototypes are designed such that the temperature of the batteries, which increases during flight, does not exceed a predetermined limit value without there being active heat exchange.

SUBJECT OF THE INVENTION

The present invention aims to remedy all or some of these drawbacks.

To this end, according to a first aspect, the present invention relates to a device for cooling at least one autonomous electric power source of an aircraft, which comprises:
  an inlet for air cooling a cooling fluid,
  the cooling fluid is fed towards at least one autonomous electric power source of the aircraft,
  a convergent hot air outlet, comprising moving means for controlling the air flowrate, and
  supervision means of the aircraft, which control the moving means for controlling the air flowrate depending on the need for cooling of the autonomous electric power source.

The advantage of these embodiments is that the temperature of at least one autonomous electric power source is controlled during the charging and discharging phases of the batteries. An autonomous electric power source can comprise a plurality of cells. For an optimum service life and performance, the autonomous electric power sources should operate at between 15° C. and 35° C. and the temperature difference between two cells should not exceed 5° C. The device that is the subject of the present invention makes it possible to meet these requirements and thus to reduce the operating costs of an aircraft comprising such a device.

Moreover, the active control of the cooling need by the supervision means, and thus the displacement of the moving means for controlling the air flowrate, allows a decrease in the cooling flow resistance.

In embodiments, the need for cooling of the autonomous electric power source is transmitted to the supervision means by a BMS ("Battery Management System").

These embodiments have the advantage of using data representative of the state of the autonomous electric power sources in real time.

In embodiments, the cooling fluid is the air arriving through the air inlet.

The use of air as cooling fluid has the advantage of minimizing the mass of the device. All the more so since, in flight, the speed of propulsion of the aeroplane makes it possible to feed air directly towards the batteries without the need for a complementary ventilation device.

In embodiments, the device that is the subject of the present invention comprises a heat exchanger, a reservoir and a pump, and the fluid is a liquid.

The advantage of these embodiments is that more homogeneous cooling of the cells of at least one autonomous electric power source is allowed.

In embodiments, the device that is the subject of the present invention is installed under the wing of the aircraft.

These embodiments have the advantage of minimizing the cooling flow resistance.

In embodiments, the device that is the subject of the present invention comprises a removable ventilation device which supplies the air inlet and in which the air flowrate is controlled by the supervision means of the aircraft.

The advantage of these embodiments is that it is possible to control the temperature of at least one autonomous electric power source in the charging phase so as to optimize the service life and the performance of at least one autonomous electric power source.

Moreover, the removable ventilation device is modular. Since the ventilation device is installed during recharging phases of at least one autonomous electric power source on the ground, the weight of the ventilation device does not affect the performance of the aircraft in flight.

In addition, the traceability, the history, the monitoring and the maintenance of the autonomous power source are improved.

In embodiments, the device that is the subject of the present invention comprises means for fastening the removable ventilation device to the aircraft.

These embodiments have the advantage of making it possible to fasten the removable ventilation device rapidly to the aircraft in order to carry out rapid recharging of at least one autonomous electric power source. Recharging of the autonomous electric power source is rendered easier.

According to a second aspect, the present invention relates to a method for cooling at least one autonomous electric power source of an aircraft comprising a device that is the subject of the present invention, said method comprising the following steps:
  entry of air cooling a cooling fluid through the air inlet,
  feeding of the cooling fluid towards at least one autonomous electric power source of the aircraft,
  convergence of hot air at the outlet,
  calculation of the need for cooling of the autonomous electric power source by supervision means of the aircraft, and
  controlling of the moving means for controlling the air flowrate.

Since the advantages, aims and particular features of the method that is the subject of the present invention are similar to those of the device that is the subject of the present invention, they are not repeated here.

In embodiments, the method that is the subject of the present invention comprises the following steps:
- fastening of the removable ventilation device to the aircraft,
- supplying of electric current to the removable ventilation device, and
- controlling of the air flowrate of the ventilation device.

Since the advantages, aims and particular features of the method that is the subject of the present invention are similar to those of the device that is the subject of the present invention, they are not repeated here.

According to a third aspect, the present invention relates to an aircraft which comprises a device that is the subject of the present invention.

Since the advantages, aims and particular features of the aircraft that is the subject of the present invention are similar to those of the device that is the subject of the present invention, they are not repeated here.

BRIEF DESCRIPTION OF THE FIGURES

Further advantages, aims and particular features of the invention will become apparent from the following non-limiting description of at least one particular embodiment of a device and of a method for cooling at least one autonomous electric power source of an aircraft and of an aircraft comprising such a device, with reference to the appended drawings, in which.

DESCRIPTION OF EXEMPLARY EMBODIMENTS OF THE INVENTION

It should be noted from the outset that the figures are not to scale.

The present description is given by way of nonlimiting example, each feature of one embodiment being able to be combined with any other feature of any other embodiment in an advantageous manner.

It should be noted that the term "a/an" is used in the meaning of "at least one".

Figure 1:
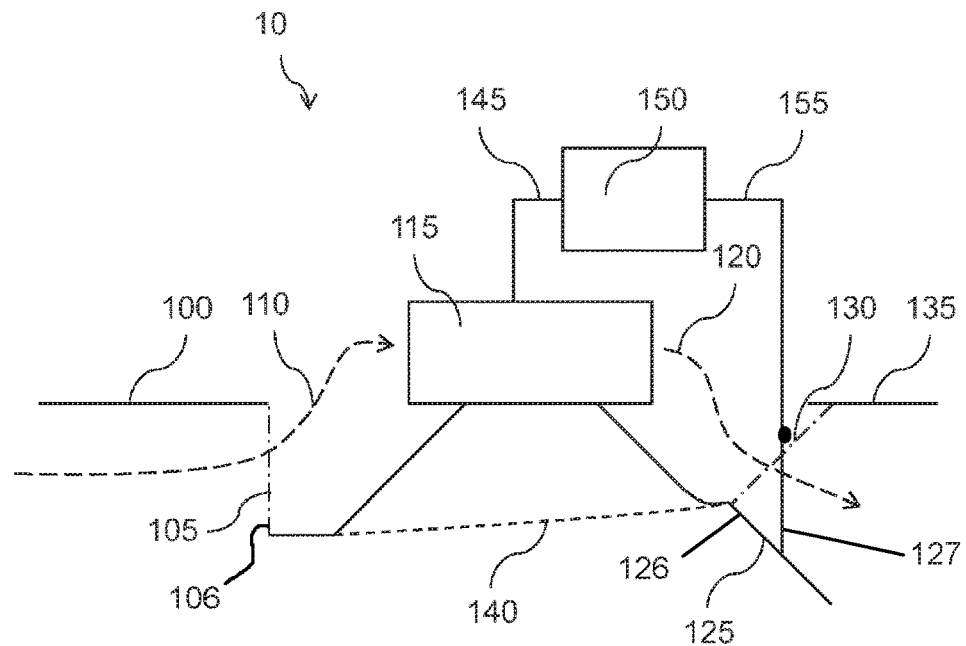
FIG. 1 schematically shows a first particular embodiment of a device that is the subject of the present invention, FIG. 2 schematically shows a second particular embodiment of a device that is the subject of the present invention, FIG. 3 schematically shows a third particular embodiment of a device that is the subject of the present invention, FIG. 4 schematically shows a fourth particular embodiment of a device that is the subject of the present invention, FIG. 5 schematically shows a first embodiment of a ventilation device comprised by a device that is the subject of the present invention.

FIG. 1 shows a particular embodiment 10 of a device that is the subject of the present invention.

The device 10 for cooling at least one autonomous electric power source 115 of an aircraft comprises:
- an inlet 105 for air 110 cooling a cooling fluid 110, the cooling fluid 110 is fed towards at least one autonomous electric power source 115 of the aircraft,
- a convergent hot air 120 outlet 130, comprising moving means 125 for controlling the air 120 flowrate, and
- supervision means 150 of the aircraft, which control the moving means 125 for controlling the air 120 flowrate depending on the need 145 for cooling of the autonomous electric power source 115.

A structure 100 and 135 of the aircraft comprises the cooling device 10. The structure 100 and 135 is a wing of the aircraft or a central part of the aircraft, for example. Preferably, the structure 100 and 135 comprising the cooling device 10 is situated under the aircraft.

The device 10 comprises an air inlet 105. The air 110 inlet 105 is an opening in a fairing 140 of the aircraft. Preferably, the air 110 inlet 105 is protected by a grille 106 that limits the inlet of debris into the air inlet 105.

The cooling fluid 110 fed towards at least one autonomous electric power source 115 of the aircraft is air.

Preferably, the autonomous electric power source 115 comprises at least one 250 V lithium-ion polymer battery. In embodiments, the autonomous electric power source 115 comprises at least one lithium-sulphur battery. In embodiments, the autonomous electric power source 115 comprises at least one lithium-air battery.

The autonomous electric power source 115 comprises a BMS ("Battery Management System"). The BMS controls the parameters of the autonomous electric power source 115. The parameters controlled are the current, the state of charge and the temperature of the autonomous electric power source 115, for example.

The convergent hot air 120 outlet 130 comprises moving means 125 for controlling the air 120 flowrate. The hot air 120 outlet 130 is preferably a convergent nozzle that accelerates the air 120 and limits the flow resistance. The acceleration of the air 120 at the outlet is close to that of the flow over the fuselage. The moving means 125 for controlling the air 120 flowrate are a moving flap 126 and an actuator 127 of the moving flap. In embodiments, the moving means 125 for controlling the air 120 flowrate comprise a plurality of moving flaps and a plurality of actuators, one actuator being associated with one moving flap. Each moving flap corresponds to a cell of the autonomous electric power source 115.

The supervision means 150 of the aircraft control the moving means 125 for controlling the air 120 flowrate depending on the need 145 for cooling of the autonomous electric power source 115. The need 145 for cooling of the autonomous electric power source 115 is transmitted to the supervision means 150 of the aircraft by the BMS.

Preferably, the supervision means 150 of the aircraft are an aircraft supervisor. An aircraft supervisor controls each motor controller, carries out the intelligent management of sensitive functions of the aircraft such as, for example, the management of each autonomous electric power source 115 of each motor, the generation of alarms and the prediction of a need for maintenance. Preferably, the supervision means 150 are a microprocessor comprising software.

Preferably, the device 10 is used to cool an autonomous electric power source 115 in flight and thus in the discharging phase. The dynamic pressure resulting from the relative speed of the air over a fuselage of the aircraft is captured by the air 110 inlet 105 and creates an air 110 flowrate within the fairing 140. The radius of an inlet lip of the fairing and the profile of the fairing are optimized in order to minimize the flow resistance brought about by the device 10.

The supervision means 150 acquire the need 145 for cooling of the autonomous electric power source 115 by means of the BMS of the autonomous electric power source 115. The supervision means 150 send a command 155 to the means 125 for controlling the air 120 flowrate. The command 155 is a command for opening or closing the means 125 for controlling the air 120 flowrate, for example. The command 155 for the air 120 flowrate depends on:
- the outside temperature captured by the supervision means 150,
- the altitude of the aircraft captured by the supervision means 150, the altitude of the aircraft having an impact on the air density and the mass flowrate of the air, and
- the power necessary for flight and thus the power supplied by the autonomous electric power source 115.

The command 155 for the air 120 flowrate is:
- a command for opening the moving flap of the means 125 for controlling the air 120 flowrate by the actuator if the temperature of the autonomous electric power source 115 is intended to decrease,
- a command for closing the moving flap of the means 125 for controlling the air 120 flowrate by the actuator if the temperature of the autonomous electric power source 115 is intended to increase, or
- a command for maintaining the position of the moving flap of the means 125 for controlling the air 120 flowrate by the actuator if the temperature of the autonomous electric power source 115 is intended to remain more or less the same.

In the event of a need for heating of the autonomous electric power source 115, the moving flap of the means 125 for controlling the air 120 flowrate is closed. The air 120 flowrate is thus substantially zero and the heating of the autonomous electric power source 115 is carried out by means of the thermal energy produced by the discharging autonomous electric power source 115. Once an optimum temperature of the autonomous electric power source 115 has been achieved, the supervision means 150 control the means 125 for controlling the air 120 flowrate.

Figure 2:
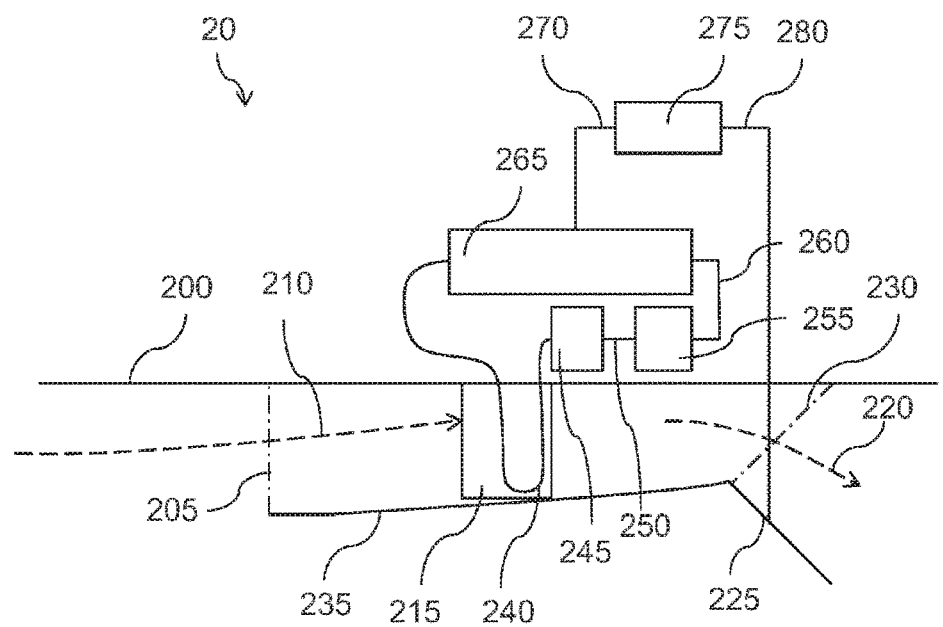

FIG. 2 shows a particular embodiment 20 of a device that is the subject of the present invention.

The device 20 for cooling at least one autonomous electric power source 265 of an aircraft comprises:
- an inlet 205 for air 210 cooling a cooling fluid 240, the cooling fluid 240 is fed towards at least one autonomous electric power source 265 of the aircraft,
- a convergent hot air 220 outlet 230, comprising moving means 225 for controlling the air 220 flowrate, and
- supervision means 275 of the aircraft, which control the moving means 225 for controlling the air 220 flowrate depending on the need 270 for cooling of the autonomous electric power source 265.

A structure 200 of the aircraft comprises the cooling device 20. The structure 200 is a wing of the aircraft or a central part of the aircraft, for example. Preferably, the structure 200 comprising the cooling device 20 is situated under the aircraft.

The device 20 comprises an air 210 inlet 205. The air 210 inlet 205 is an opening in a fairing 235 of the aircraft. Preferably, the air 210 inlet 205 is protected by a grille that limits the inlet of debris into the air 210 inlet 205.

The cooling fluid 240 fed towards at least one autonomous electric power source 265 of the aircraft is a liquid. Preferably, the liquid is a heat transfer liquid such as a mixture of water and ethylene glycol. The device 20 comprises a fluid 240 reservoir 245, a pump 255 and a heat exchanger 215.

The fluid 240 is fed towards a reservoir 245. The fluid 240 is taken from the reservoir 245 at a flowrate 250 by a pump 255. The fluid 260 at the flowrate 250 is fed through the autonomous power source. Heat exchange is carried out, the autonomous electric power source 265 is cooled and the fluid 260 is heated. The heated fluid 240 is fed towards a heat exchanger 215. In the heat exchanger 215, the fluid 240 is cooled by coming into contact with the air 210. The heated air 220 at the outlet of the heat exchanger 215 is fed towards the air 220 outlet 230.

Preferably, the autonomous electric power source 265 comprises at least one 250 V lithium-ion polymer battery. In embodiments, the autonomous electric power source 265 comprises at least one lithium-sulphur battery. In embodiments, the autonomous electric power source 265 comprises at least one lithium-air battery.

The autonomous electric power source 265 comprises a BMS ("Battery Management System"). The BMS controls the parameters of the autonomous electric power source 265. The parameters controlled are the current, the state of charge and the temperature of the autonomous electric power source 265, for example.

The convergent hot air 220 outlet 230 comprises moving means 225 for controlling the air flowrate. The hot air 220 outlet 230 is preferably a convergent nozzle that accelerates the air 220 and limits the flow resistance. The acceleration of the air 220 at the outlet is close to that of the flow over the fuselage. The moving means 225 for controlling the air 220 flowrate are a moving flap and an actuator of the moving flap.

The supervision means 275 of the aircraft control the moving means 225 for controlling the air 220 flowrate depending on the need 270 for cooling of the autonomous electric power source 265. The need 270 for cooling of the autonomous electric power source 265 is transmitted to the supervision means 275 of the aircraft by the BMS.

Preferably, the supervision means 275 of the aircraft are an aircraft supervisor. An aircraft supervisor controls each motor controller, carries out the intelligent management of sensitive functions of the aircraft such as, for example, the management of each autonomous electric power source 265 of each motor, the generation of alarms and the prediction of a need for maintenance. Preferably, the supervision means 275 are a microprocessor comprising software.

Preferably, the device 20 is used to cool an autonomous electric power source 265 in flight and thus in the discharging phase. The dynamic pressure resulting from the relative speed of the air over a fuselage of the aircraft is captured by the air inlet 205 and creates an air 210 flowrate within the fairing 235. The radius of an inlet lip of the fairing and the profile of the fairing are optimized in order to minimize the flow resistance brought about by the device 20. The autonomous electric power source 265 is cooled by means of the heat exchanger 215 as described above.

The supervision means 275 acquire the need 270 for cooling of the autonomous electric power source 265 by means of the BMS of the autonomous electric power source 265. The supervision means 275 send a command 280 to the means 225 for controlling the air 220 flowrate. The command 280 is a command for opening or closing the means 225 for controlling the air 220 flowrate, for example. The command 280 for the air 220 flowrate depends on:
- the outside temperature captured by the supervision means 275, the altitude of the aircraft captured by the supervision means 275, the altitude of the aircraft having an impact on the air density and the mass flowrate of the air, and the power necessary for flight and thus the power supplied by the autonomous electric power source 265.

The command 280 for the air flowrate is:
- a command for opening the moving flap of the means 225 for controlling the air 220 flowrate by the actuator if the temperature of the autonomous electric power source 265 is intended to decrease,
- a command for closing the moving flap of the means 225 for controlling the air 220 flowrate by the actuator if the temperature of the autonomous electric power source 265 is intended to increase, or
- a command for maintaining the position of the moving flap of the means 225 for controlling the air 220 flowrate by the actuator if the temperature of the autonomous electric power source 265 is intended to remain more or less the same.

In the event of a need for heating of the autonomous electric power source 265, the moving flap of the means 225 for controlling the air 220 flowrate is closed. The air 220 flowrate is thus substantially zero and the heating of the autonomous electric power source 265 is carried out by means of the thermal energy produced by the discharging autonomous electric power source 265. Once an optimum temperature of the autonomous electric power source 265 has been achieved, the supervision means 275 control the means 225 for controlling the air 220 flowrate.

Preferably, simultaneously with the closure of the moving flap of the means 225 for controlling the air 220 flowrate, the pump 255 is taken out of operation. In addition, once an optimum temperature of the autonomous electric power source 265 has been reached, the supervision means 275 command the starting up of the pump 255.

Figure 3:
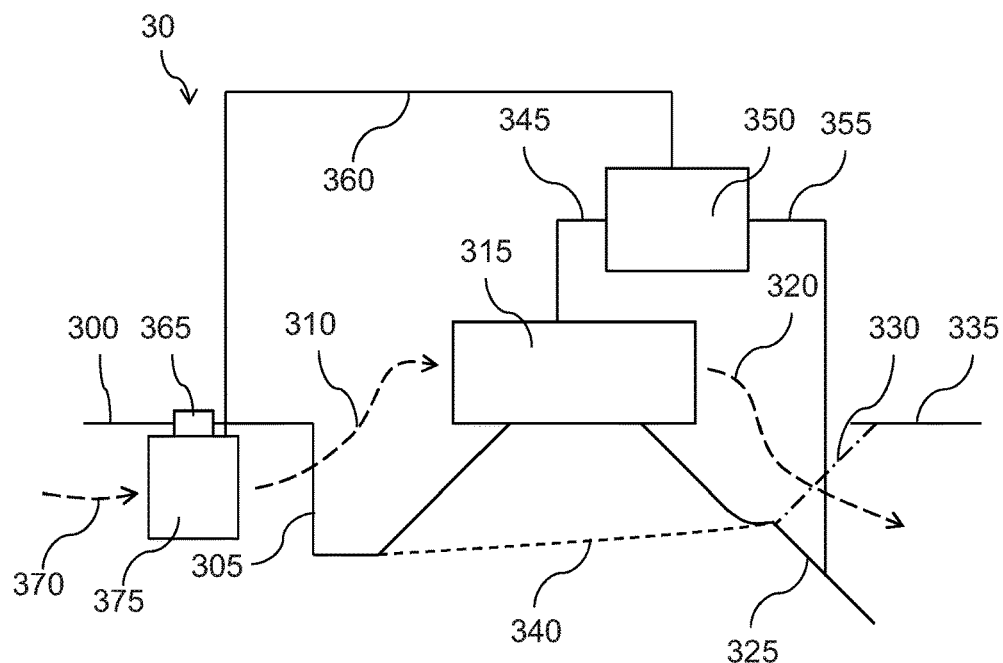

FIG. 3 shows a particular embodiment 30 of a device that is the subject of the present invention.

The device 30 for cooling at least one autonomous electric power source 315 of an aircraft comprises:
- an inlet 305 for air 310 cooling a cooling fluid 310, the cooling fluid 310 is fed towards at least one autonomous electric power source 315 of the aircraft,
- a convergent hot air 320 outlet 330, comprising moving means 325 for controlling the air 320 flowrate,
- supervision means 350 of the aircraft, which control the moving means 325 for controlling the air 320 flowrate depending on the need 345 for cooling of the autonomous electric power source 315, and
- a removable ventilation device 375 which supplies the air inlet 305 and in which the air 310 flowrate is controlled by the supervision means 350 of the aircraft, and which comprises means 365 for fastening the removable ventilation device 375.

A structure 300 and 335 of the aircraft comprises the cooling device 30. The structure 300 and 335 is a wing of the aircraft or a central part of the aircraft, for example. Preferably, the structure 300 and 335 comprising the cooling device 30 is situated under the aircraft.

The device 30 comprises an air 310 inlet 305. The air 310 inlet 305 is an opening in a fairing 340 of the aircraft. Preferably, the air 310 inlet 305 is protected by a grille that limits the inlet of debris into the air 310 inlet 305.

The cooling fluid 310 fed towards at least one autonomous electric power source 315 of the aircraft is air.

The removable ventilation device 375 which supplies the air 310 inlet 305 and in which the air 310 flowrate is controlled by the supervision means 350 of the aircraft comprises means 365 for fastening the removable ventilation device 375. The fastening means are fastened to corresponding fastening means on the structure 300 and 335 of the aircraft in front of the air inlet 305. Preferably, the removable ventilation device 375 comprises at least one fan. In embodiments, the removable ventilation device 375 comprises at least one air compressor. The removable ventilation device 375 comprises electric power supply means such as a socket, for example.

Preferably, the autonomous electric power source 315 comprises at least one 250 V lithium-ion polymer battery. In embodiments, the autonomous electric power source 315 comprises at least one lithium-sulphur battery. In embodiments, the autonomous electric power source 315 comprises at least one lithium-air battery.

The autonomous electric power source 315 comprises a BMS ("Battery Management System"). The BMS controls the parameters of the autonomous electric power source 315. The parameters controlled are the current, the state of charge and the temperature of the autonomous electric power source 315, for example.

The convergent hot air 320 outlet 330 comprises moving means 325 for controlling the air 320 flowrate. The hot air 320 outlet 330 is preferably a convergent nozzle that accelerates the air 320 and limits the flow resistance when the aircraft is in flight. The moving means 325 for controlling the air 320 flowrate are a moving flap and an actuator of the moving flap. In embodiments, the moving means 325 for controlling the air 320 flowrate comprise a plurality of moving flaps and a plurality of actuators, one actuator being associated with one moving flap. Each moving flap corresponds to a cell of the autonomous electric power source 315.

The supervision means 350 of the aircraft control the moving means 325 for controlling the air 320 flowrate depending on the need 345 for cooling of the autonomous electric power source 315. The need 345 for cooling of the autonomous electric power source 315 is transmitted to the supervision means 350 of the aircraft by the BMS.

The supervision means 350 of the aircraft control the ventilation device 375 depending on the need 370 for cooling of the autonomous electric power source 315. The need 370 for cooling of the autonomous electric power source 315 is transmitted to the supervision means 350 of the aircraft by the BMS.

Preferably, the supervision means 350 of the aircraft are an aircraft supervisor. An aircraft supervisor controls each motor controller, carries out the intelligent management of sensitive functions of the aircraft such as, for example, the management of each autonomous electric power source 315 of each motor, the generation of alarms and the prediction of a need for maintenance. Preferably, the supervision means 350 are a microprocessor comprising software.

Preferably, the device 30 is used to cool an autonomous electric power source 315 when on the ground and stopped, and thus in the charging phase. The ventilation device 375 receives a command 360, transmitted by the supervision means 350, for the air 310 flowrate at the outlet of the ventilation device 375. The air 370 is drawn in by the ventilation device 375 and accelerated. The air 310 at the outlet of the ventilation device 375 is sent into the air 310 inlet 305 of the device 30 at the flowrate commanded by the supervision means 350. The ventilation device 375 creates an air 310 flowrate inside the fairing 340.

The supervision means 350 acquire the need 345 for cooling of the autonomous electric power source 315 by means of the BMS of the autonomous electric power source 315. The supervision means 350 send a command 360 to the ventilation device 375. The command 360 is a command for acceleration or deceleration of ventilation, for example. The command 360 for the air 310 flowrate depends on:
- the outside temperature captured by the supervision means 350,
- the altitude of the aircraft captured by the supervision means 350, the altitude of the aircraft having an impact on the air density and the mass flowrate of the air, and
- the charging time of the autonomous electric power source 315, and thus the grounding time of the aircraft.

The command 360 for the air 310 flowrate is:
- a command for acceleration of ventilation if the temperature of the autonomous electric power source 315 is intended to decrease,
- a command for reducing ventilation if the temperature of the autonomous electric power source 315 is intended to increase, or
- a command for maintaining the speed of ventilation if the temperature of the autonomous electric power source 315 is intended to remain more or less the same.

In the event of a need for heating of the autonomous electric power source 315, the ventilation device 375 is thus taken out of operation. The air 310 flowrate is thus substantially zero and the heating of the autonomous electric power source 315 is carried out by means of the thermal energy produced by the discharging autonomous electric power source 315. Once an optimum temperature of the autonomous electric power source 315 has been achieved, the supervision means 350 control the ventilation device 375.

The supervision means 350 acquire the need 345 for cooling of the autonomous electric power source 315 by means of the BMS of the autonomous electric power source 315. The supervision means 350 send a command 355 to the means 325 for controlling the air 320 flowrate. The command 355 is a command for opening or closing the means 325 for controlling the air 320 flowrate, for example. The command 355 for the air 320 flowrate depends on:
- the outside temperature captured by the supervision means 350,
- the altitude of the aircraft captured by the supervision means 350, the altitude of the aircraft having an impact on the air density and the mass flowrate of the air, and
- the charging time of the autonomous electric power source 315, and thus the grounding time of the aircraft.

The command 355 for the air 320 flowrate is:
- a command for opening the moving flap of the means 325 for controlling the air 320 flowrate by the actuator if the temperature of the autonomous electric power source 315 is intended to decrease,
- a command for closing the moving flap of the means 325 for controlling the air 320 flowrate by the actuator if the temperature of the autonomous electric power source 315 is intended to increase, or
- a command for maintaining the position of the moving flap of the means 325 for controlling the air 320 flowrate by the actuator if the temperature of the autonomous electric power source 315 is intended to remain more or less the same.

In the event of a need for heating of the autonomous electric power source 315, the moving flap of the means 325 for controlling the air 320 flowrate is closed. The air 320 flowrate is thus substantially zero and the heating of the autonomous electric power source 315 is carried out by means of the thermal energy produced by the discharging autonomous electric power source 315. Once an optimum temperature of the autonomous electric power source 315 has been achieved, the supervision means 350 control the means 325 for controlling the air 320 flowrate.

Preferably, the commands 355 and 360 issued by the supervision means 350 correspond to one another for each need 345 for cooling of the autonomous electric power source 315.

Figure 4:
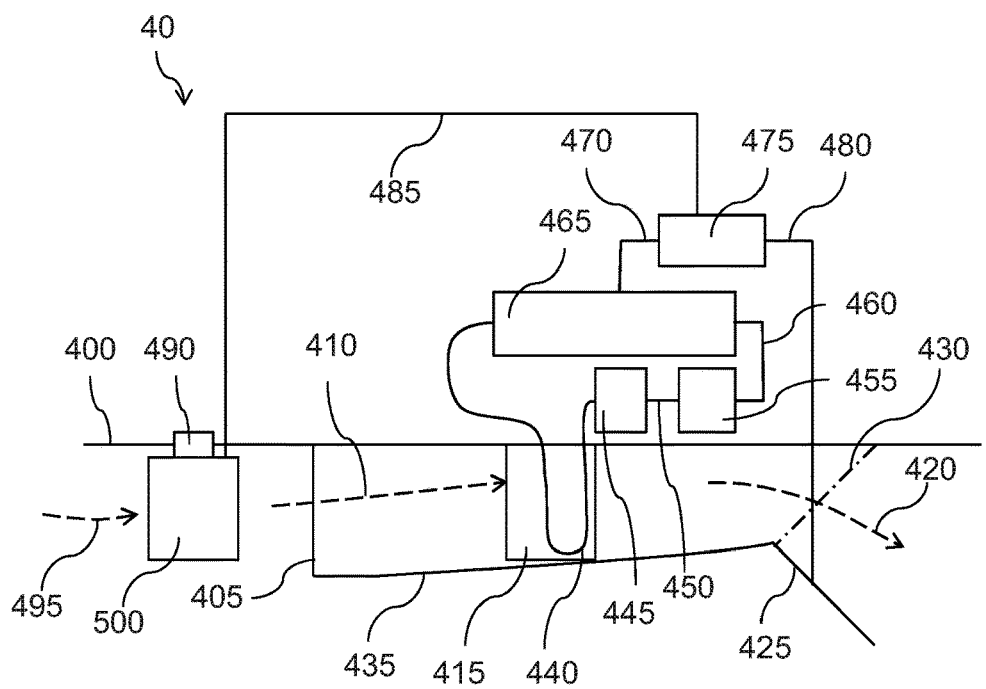

FIG. 4 shows a particular embodiment 40 of a device that is the subject of the present invention.

The device 40 for cooling at least one autonomous electric power source 465 of an aircraft comprises:
- an inlet 405 for air 410 cooling a cooling fluid 440, the cooling fluid 440 is fed towards at least one autonomous electric power source 465 of the aircraft,
- a convergent hot air 420 outlet 430, comprising moving means 425 for controlling the air 420 flowrate,
- supervision means 475 of the aircraft, which control the moving means 425 for controlling the air 420 flowrate depending on the need 470 for cooling of the autonomous electric power source 465, and
- a removable ventilation device 500 which supplies the air 410 inlet 405 and in which the air 410 flowrate is controlled by the supervision means 475 of the aircraft, and which comprises means 490 for fastening the removable ventilation device 500.

A structure 400 of the aircraft comprises the cooling device 40. The structure 400 is a wing of the aircraft or a central part of the aircraft, for example. Preferably, the structure 400 comprising the cooling device 40 is situated under the aircraft.

The device 40 comprises an air 410 inlet 405. The air 410 inlet 405 is an opening in a fairing 435 of the aircraft. Preferably, the air 410 inlet 405 is protected by a grille that limits the inlet of debris into the air 410 inlet 405.

The cooling fluid 440 fed towards at least one autonomous electric power source 465 of the aircraft is a liquid. Preferably, the liquid is a heat transfer liquid such as a mixture of water and ethylene glycol. The device 40 comprises a fluid 440 reservoir 445, a pump 455 and a heat exchanger 415.

The fluid 440 is fed towards a reservoir 445. The fluid 440 is taken from the reservoir 445 at a flowrate 450 by a pump 455. The fluid 460 at the flowrate 450 is fed through the autonomous power source. Heat exchange is carried out, the autonomous electric power source 465 is cooled and the fluid 460 is heated. The heated fluid 440 is fed towards a heat exchanger 415. In the heat exchanger 415, the fluid 440 is cooled by coming into contact with the air 410. The heated air 420 at the outlet of the heat exchanger 415 is fed towards the air 420 outlet 430.

The removable ventilation device 500 which supplies the air inlet 405 and in which the air 410 flowrate is controlled by the supervision means 475 of the aircraft comprises means 490 for fastening the removable ventilation device 500. The fastening means 490 are fastened to corresponding fastening means on the structure 400 of the aircraft in front of the air inlet 405. Preferably, the removable ventilation device 500 comprises at least one fan. In embodiments, the removable ventilation device 500 comprises at least one air compressor. The removable ventilation device 500 comprises electric power supply means such as a socket, for example.

Preferably, the autonomous electric power source 465 comprises at least one 250 V lithium-ion polymer battery. In embodiments, the autonomous electric power source 465 comprises at least one lithium-sulphur battery. In embodiments, the autonomous electric power source 465 comprises at least one lithium-air battery.

The autonomous electric power source 465 comprises a BMS ("Battery Management System"). The BMS controls the parameters of the autonomous electric power source 465. The parameters controlled are the current, the state of charge and the temperature of the autonomous electric power source 465, for example.

The convergent hot air 420 outlet 430 comprises moving means 425 for controlling the air flowrate. The hot air 420 outlet 430 is preferably a convergent nozzle that accelerates the air 420 and limits the flow resistance when the aircraft is in flight. The moving means 425 for controlling the air 420 flowrate are a moving flap and an actuator of the moving flap.

The supervision means 475 of the aircraft control the moving means 425 for controlling the air 420 flowrate depending on the need 470 for cooling of the autonomous electric power source 465. The need 470 for cooling of the autonomous electric power source 465 is transmitted to the supervision means 475 of the aircraft by the BMS.

The supervision means 475 of the aircraft control the ventilation device 500 depending on the need 470 for cooling of the autonomous electric power source 465. The need 470 for cooling of the autonomous electric power source 465 is transmitted to the supervision means 475 of the aircraft by the BMS.

Preferably, the supervision means 475 of the aircraft are an aircraft supervisor. An aircraft supervisor controls each motor controller, carries out the intelligent management of sensitive functions of the aircraft such as, for example, the management of each autonomous electric power source 465 of each motor, the generation of alarms and the prediction of a need for maintenance. Preferably, the supervision means 475 are a microprocessor comprising software.

Preferably, the device 40 is used to cool an autonomous electric power source 465 when on the ground and stopped, and thus in the charging phase. The ventilation device 500 receives a command 485 for the air 410 flowrate at the outlet of the ventilation device 500. The air 495 is drawn in by the ventilation device 500 and accelerated. The air 410 at the outlet of the ventilation device 500 is sent into the air inlet 405 of the device 40 at the flowrate commanded by the supervision means 475. The ventilation device 500 creates an air 410 flowrate inside the fairing 435. The radius of an inlet lip of the fairing 435 and the profile of the fairing 435 are optimized in order to minimize the flow resistance brought about by the device 40.

The supervision means 475 acquire the need 470 for cooling of the autonomous electric power source 465 by means of the BMS of the autonomous electric power source 465. The supervision means 475 send a command 485 to the ventilation device 500. The command 485 is a command for acceleration or deceleration of ventilation, for example. The command 485 for the air 410 flowrate depends on:
the outside temperature captured by the supervision means 475,
the altitude of the aircraft captured by the supervision means 475, the altitude of the aircraft having an impact on the air density and the mass flowrate of the air, and
the charging time of the autonomous electric power source 465, and thus the grounding time of the aircraft.

The command 485 for the air 410 flowrate is:
a command for acceleration of ventilation if the temperature of the autonomous electric power source 465 is intended to decrease,
a command for reducing ventilation if the temperature of the autonomous electric power source 465 is intended to increase, or
a command for maintaining the speed of ventilation if the temperature of the autonomous electric power source 465 is intended to remain more or less the same.

In the event of a need for heating of the autonomous electric power source 465, the ventilation device 500 is thus taken out of operation. The air 410 flowrate is thus substantially zero and the heating of the autonomous electric power source 465 is carried out by means of the thermal energy produced by the discharging autonomous electric power source 465. Once an optimum temperature of the autonomous electric power source 465 has been achieved, the supervision means 475 control the ventilation device 500.

The supervision means 475 acquire the need 470 for cooling of the autonomous electric power source 465 by means of the BMS of the autonomous electric power source 465. The supervision means 475 send a command 480 to the means 425 for controlling the air 420 flowrate. The command 480 is a command for opening or closing the means 425 for controlling the air 420 flowrate, for example. The command 480 for the air 420 flowrate depends on:
the outside temperature captured by the supervision means 475,
the altitude of the aircraft captured by the supervision means 475, the altitude of the aircraft having an impact on the air density and the mass flowrate of the air, and
the power necessary for flight and thus the power supplied by the autonomous electric power source 465.

The command 480 for the air flowrate is:
a command for opening the moving flap of the means 425 for controlling the air 420 flowrate by the actuator if the temperature of the autonomous electric power source 465 is intended to decrease,
a command for closing the moving flap of the means 425 for controlling the air 420 flowrate by the actuator if the temperature of the autonomous electric power source 465 is intended to increase, or
a command for maintaining the position of the moving flap of the means 425 for controlling the air 420 flowrate by the actuator if the temperature of the autonomous electric power source 465 is intended to remain more or less the same.

In the event of a need for heating of the autonomous electric power source 465, the moving flap of the means 425 for controlling the air 420 flowrate is closed. The air 420 flowrate is thus substantially zero and the heating of the autonomous electric power source 465 is carried out by means of the thermal energy produced by the discharging autonomous electric power source 465. Once an optimum temperature of the autonomous electric power source 465 has been achieved, the supervision means 475 control the means 425 for controlling the air 420 flowrate.

Preferably, simultaneously with the closure of the moving flap of the means 425 for controlling the air 420 flowrate, the pump 455 is taken out of operation. In addition, once an optimum temperature of the autonomous electric power source 465 has been reached, the supervision means 475 command the starting up of the pump 455.

Preferably, the commands 480 and 485 issued by the supervision means 475 correspond to one another for each need 470 for cooling of the autonomous electric power source 465.

Figure 5:
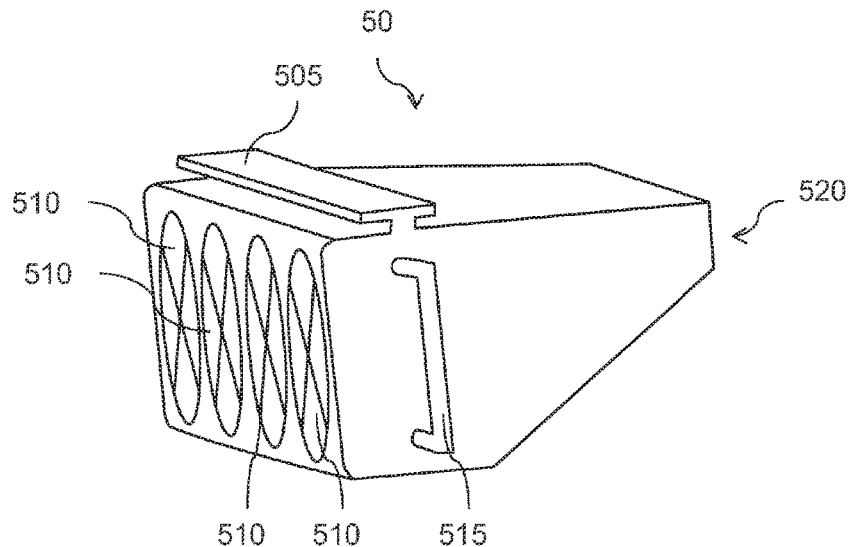

FIG. 5 shows a particular embodiment 50 of a ventilation device comprised in a cooling device that is the subject of the present invention.

Preferably, the ventilation devices 375 and 500 described in FIGS. 3 and 4 are the embodiment 50 of the ventilation device.

The ventilation device 50 comprises means 505 for fastening the ventilation device 50 to the aircraft.

The fastening means 505 are clips or hooks, for example. Preferably, the fastening means 505 are configured such that a user rapidly fastens the ventilation device 50 to the aircraft, which comprises corresponding fastening means, in an unimpeded manner.

The ventilation device 50 comprises at least one fan 510. Preferably, the ventilation device 50 comprises four fans 510. In embodiments, the ventilation device 50 comprises at least one air compressor.

The ventilation device 50 comprises at least one carrying handle 515. Preferably, the ventilation device 50 comprises two carrying handles 515 positioned in a substantially symmetrical manner.

The ventilation device 50 comprises an air outlet 520. The air emerging from the air outlet 520 is at a flowrate commanded by supervision means of the aircraft.

The removable ventilation device 50 comprises electric power supply means such as a socket, for example.

Figure 6:
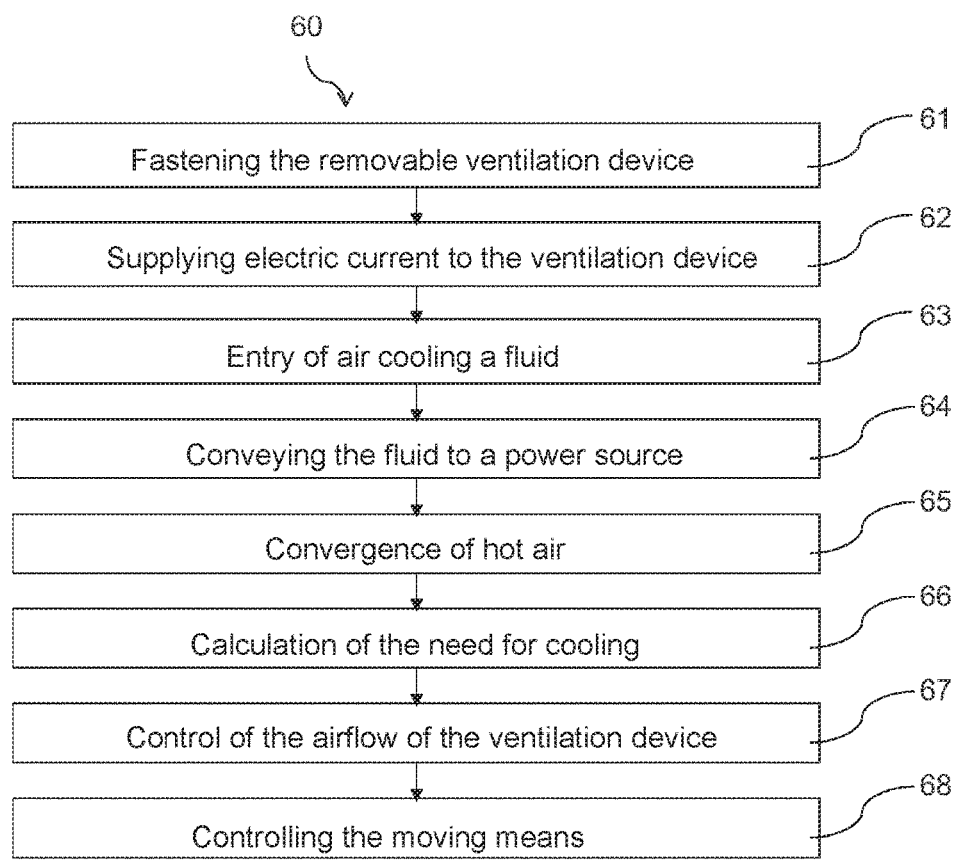
FIG. 6 shows a first particular embodiment of a method that is the subject of the present invention, in the form of a flowchart.

FIG. 6 shows a particular embodiment of a cooling method 60 that is the subject of the present invention.

The method 60 for cooling at least one autonomous electric power source 315 or 465 of an aircraft comprising a device 30 or 40 comprises the following steps:
- fastening 61 of the removable ventilation device 375, 500 or 50 to the aircraft,
- supplying 62 of electric current to the removable ventilation device 375, 500 or 50,
- entry 63 of air 310 or 410 cooling a cooling fluid 310 or 440 through the air inlet 305 or 405,
- feeding 64 of the cooling fluid 310 or 440 towards at least one autonomous electric power source 315 or 465 of the aircraft,
- convergence 65 of hot air 320 or 420 at the outlet,
- calculation 66 of the need 345 or 470 for cooling of the autonomous electric power source 315 or 465 by supervision means 350 or 475 of the aircraft,
- controlling 67 of the air 310 or 410 flowrate of the ventilation device 375 or 500, and
- controlling 68 of the moving means 325 or 425 for controlling the air 320 or 420 flowrate.

Preferably, the method 60 is implemented by an embodiment 30 or 40 of the device that is the subject of the present invention.

The removable ventilation device 375, 500 or 50 on the aircraft is fastened to the aircraft by a user in fastening step 61. The fastening 61 is realized by means of fastening means 365 or 490.

Once the ventilation device 375, 500 or 50 has been fastened to the aircraft, a user then connects electric power supply means comprised by the device 375, 500 or 50 to an electric network. The step 62 of supplying the removable ventilation device 375, 500 or 50 with electric current is then carried out.

The ventilation device 375, 500 or 50 is started up and implements the step of the entry 63 of air 310 or 410 cooling a cooling fluid 310 or 440 through the air inlet 305 or 405. The entry 63 of air 310 or 410 is realized by the starting up of the ventilation created by the ventilation device 375, 500 or 50.

The feeding 64 of the cooling fluid 310 or 440 towards at least one autonomous electric power source 315 or 465 of the aircraft is carried out automatically by means of the air 310 or 410 flowrate created.

The convergence 65 of hot air 320 or 420 at the outlet of the cooling device 30 or 40 is implemented automatically by the air outlet 330 or 430.

The step of calculation 66 of the need 345 or 470 for cooling of the autonomous electric power source 315 or 465 by supervision means 350 or 475 of the aircraft is carried out by means of the BMS of the autonomous electric power source 315 or 465. The BMS controls the parameters of the autonomous electric power source 315 or 465. The parameters controlled are the current, the state of charge and the temperature of the autonomous electric power source 315 or 465, for example.

Preferably, the method 60 is implemented during the recharging of the autonomous electric power source 315 or 465 of the aircraft when the aircraft is on the ground and stopped.

The step of controlling 67 of the air 310 or 410 flowrate of the ventilation device 375 or 500 is carried out according to the following embodiments.

The supervision means 350 or 475 acquire the need 345 or 470 for cooling of the autonomous electric power source 315 or 465 by means of the BMS of the autonomous electric power source 315 or 465. The supervision means 350 or 475 send a command 360 or 485 to the ventilation device 375, 500 or 50. The command 360 or 485 is a command for acceleration or deceleration of ventilation, for example. The command 360 or 485 for the air 310 or 410 flowrate depends on:
- the outside temperature captured by the supervision means 350 or 475,
- the altitude of the aircraft captured by the supervision means 350 or 475, the altitude of the aircraft having an impact on the air density and the mass flowrate of the air, and
- the charging time of the autonomous electric power source 315 or 465, and thus the grounding time of the aircraft.

The command 360 or 485 for the air 310 or 410 flowrate is:
- a command for acceleration of ventilation if the temperature of the autonomous electric power source 315 or 465 is intended to decrease,
- a command for reducing ventilation if the temperature of the autonomous electric power source 315 or 465 is intended to increase, or
- a command for maintaining the speed of ventilation if the temperature of the autonomous electric power source 315 or 465 is intended to remain more or less the same.

In the event of a need for heating of the autonomous electric power source 315 or 465, the ventilation device 375, 500 or 50 is thus taken out of operation. The air 310 or 410 flowrate is thus substantially zero and the heating of the autonomous electric power source 315 or 465 is carried out by means of the thermal energy produced by the charging autonomous electric power source 315 or 465. Once an optimum temperature of the autonomous electric power source 315 or 465 has been achieved, the supervision means 350 or 475 control the ventilation device 375, 500 or 50.

The step of controlling 68 of the moving means 325 or 425 for controlling the air 320 or 420 flowrate is carried out according to the following embodiments.

The supervision means 350 or 475 acquire the need 345 or 470 for cooling of the autonomous electric power source 315 or 465 by means of the BMS of the autonomous electric power source 315 or 465. The supervision means 350 or 475 send a command 355 or 480 to the means 325 or 425 for controlling the air 320 or 420 flowrate. The command 355 or 480 is a command for opening or closing the means 325 or 425 for controlling the air 320 or 420 flowrate, for example. The command 355 or 480 for the air 320 or 420 flowrate depends on:

- the outside temperature captured by the supervision means 350 or 475,
- the altitude of the aircraft captured by the supervision means 350 or 475, the altitude of the aircraft having an impact on the air density and the mass flowrate of the air, and
- the charging time of the autonomous electric power source 315 or 465, and thus the grounding time of the aircraft.

The command 355 or 480 for the air 320 or 420 flowrate is:

- a command for opening the moving flap of the means 325 or 425 for controlling the air 320 or 420 flowrate by the actuator if the temperature of the autonomous electric power source 315 or 465 is intended to decrease,
- a command for closing the moving flap of the means 325 or 425 for controlling the air 320 or 420 flowrate by the actuator if the temperature of the autonomous electric power source 315 or 465 is intended to increase, or
- a command for maintaining the position of the moving flap of the means 325 or 425 for controlling the air 320 or 420 flowrate by the actuator if the temperature of the autonomous electric power source 315 or 465 is intended to remain more or less the same.

In the event of a need for heating of the autonomous electric power source 315 or 465, the moving flap of the means 325 or 425 for controlling the air 320 or 420 flowrate is closed. The air 320 or 420 flowrate is thus substantially zero and the heating of the autonomous electric power source 315 or 465 is carried out by means of the thermal energy produced by the charging autonomous electric power source 315 or 465. Once an optimum temperature of the autonomous electric power source 315 or 465 has been achieved, the supervision means 350 or 475 control the means 325 or 425 for controlling the air 320 or 420 flowrate.

Preferably, the commands 355 and 360 or 480 and 485 issued by the supervision means 350 or 475 correspond to one another for each need 345 or 470 for cooling of the autonomous electric power source 315 or 465.

The steps of entry 63, feeding 64, convergence 65, calculation 66, control 67 and control 68 are repeated up to the end of the phase of charging of the autonomous electric power source 315 or 465 of the aircraft.

Figure 7:
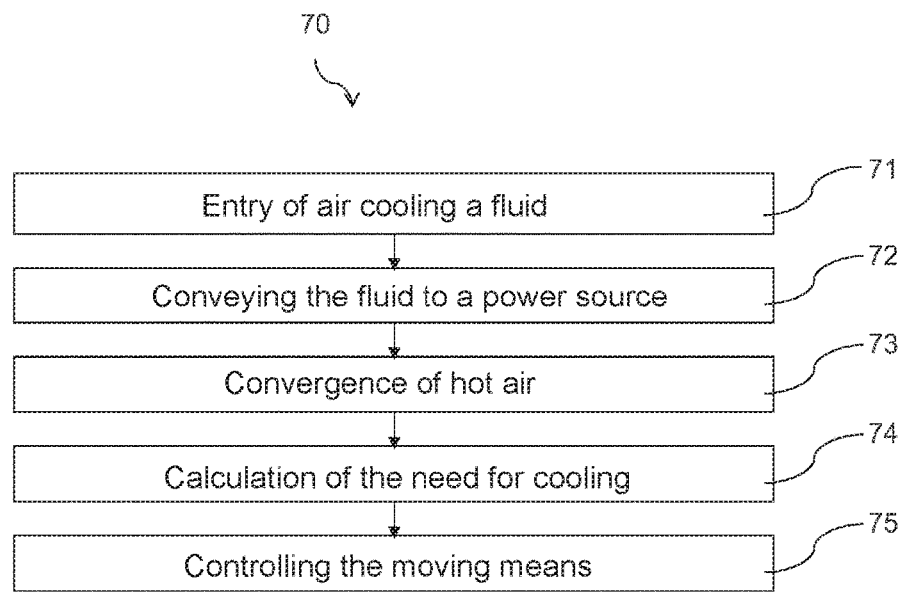
FIG. 7 shows a second particular embodiment of a method that is the subject of the present invention, in the form of a flowchart, and FIG. 8 schematically shows a perspective view of one particular embodiment of an aircraft that is the subject of the present invention.

FIG. 7 shows a particular embodiment of a cooling method 70 that is the subject of the present invention.

The method 70 for cooling at least one autonomous electric power source 115 or 265 of an aircraft comprising a device 10 or 20 comprises the following steps:

- entry 71 of air 110 or 210 cooling a cooling fluid 110 or 240 through the air inlet 105 or 205,
- feeding 72 of the cooling fluid 110 or 240 towards at least one autonomous electric power source 115 or 265 of the aircraft,
- convergence 73 of hot air 120 or 220 at the outlet,
- calculation 74 of the need 145 or 270 for cooling of the autonomous electric power source 115 or 265 by supervision means 150 or 275 of the aircraft,
- controlling 75 of the moving means 125 or 225 for controlling the air 120 or 220 flowrate.

Preferably, the method 70 is implemented by an embodiment 10 or 20 of the device that is the subject of the present invention.

The entry 71 of air 110 or 210 is realized by the dynamic pressure that results from the relative speed of the air over a fuselage of the aircraft which is captured by the air inlet 105 or 205 and which creates an air 110 or 210 flowrate inside the fairing 140 or 240.

The feeding 72 of the cooling fluid 110 or 240 towards at least one autonomous electric power source 115 or 265 of the aircraft is carried out automatically by means of the air 110 or 210 flowrate created.

The convergence 73 of hot air 120 or 220 at the outlet of the cooling device 10 or 20 is implemented by the air 120 or 220 outlet 130 or 230.

The step of calculation 74 of the need 145 or 270 for cooling of the autonomous electric power source 115 or 265 by supervision means 150 or 275 of the aircraft is carried out by means of the BMS of the autonomous electric power source 115 or 265. The BMS controls the parameters of the autonomous electric power source 115 or 265. The parameters controlled are the current, the state of charge and the temperature of the autonomous electric power source 115 or 265, for example.

Preferably, the method 70 is implemented during the discharging of the autonomous electric power source 115 or 265 of the aircraft when the aircraft is in flight.

The step of controlling 75 of the moving means 125 or 225 for controlling the air 120 or 220 flowrate is carried out according to the following embodiments.

The supervision means 150 or 275 acquire the need 145 or 270 for cooling of the autonomous electric power source 115 or 265 by means of the BMS of the autonomous electric power source 115 or 265. The supervision means 150 or 275 send a command 155 or 280 to the means 125 or 225 for controlling the air 120 or 220 flowrate. The command 155 or 280 is a command for opening or closing the means 125 or 225 for controlling the air 120 or 220 flowrate, for example. The command 155 or 280 for the air 120 or 220 flowrate depends on:

- the outside temperature captured by the supervision means 150 or 275,
- the altitude of the aircraft captured by the supervision means 150 or 275, the altitude of the aircraft having an impact on the air density and the mass flowrate of the air, and
- the power necessary for flight and thus the power supplied by the autonomous electric power source 115 or 265.

The command 155 or 280 for the air 120 or 220 flowrate is:

- a command for opening the moving flap of the means 125 or 225 for controlling the air 120 or 220 flowrate by the actuator if the temperature of the autonomous electric power source 115 or 265 is intended to decrease,
- a command for closing the moving flap of the means 125 or 225 for controlling the air 120 or 220 flowrate by the actuator if the temperature of the autonomous electric power source 115 or 265 is intended to increase, or
- a command for maintaining the position of the moving flap of the means 125 or 225 for controlling the air 120 or 220 flowrate by the actuator if the temperature of the autonomous electric power source 115 or 265 is intended to remain more or less the same.

In the event of a need for heating of the autonomous electric power source 115 or 265, the moving flap of the means 125 or 225 for controlling the air 120 or 220 flowrate is closed. The air 120 or 220 flowrate is thus substantially zero and the heating of the autonomous electric power source 115 or 265 is carried out by means of the thermal energy produced by the discharging autonomous electric power source 115 or 265. Once an optimum temperature of the autonomous electric power source 115 or 265 has been achieved, the supervision means 150 or 275 control the means 125 or 225 for controlling the air 120 or 220 flowrate.

The steps of entry 71, feeding 72, convergence 73, calculation 74 and control 75 are repeated up to the end of the phase of discharging of the autonomous electric power source 115 or 265 of the aircraft.

Figure 8:
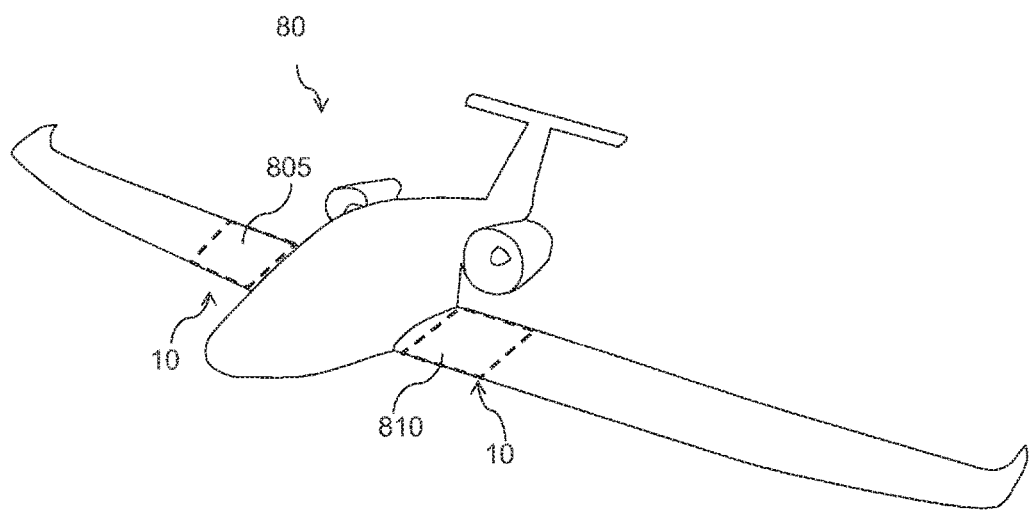

FIG. 8 shows a particular embodiment of an aircraft 80 that is the subject of the present invention.

The aircraft 80 comprises two wings.

The aircraft 80 comprises at least two autonomous electric power sources 805 and 810. Preferably, the autonomous electric power sources 805 and 810 are comprised in the wings of the aircraft 80.

Each autonomous electric power source 805 and 810 is cooled by an embodiment 10 or 20 of the device that is the subject of the present invention during the flight phase and thus during the discharging phase of the autonomous electric power sources 805 and 810. Each autonomous electric power source 805 and 810 is cooled by an embodiment 30 or 40 of the device that is the subject of the present invention when on the ground and stopped and thus during the recharging phase of the autonomous electric power sources 805 and 810.

Preferably, the aircraft 80 comprises fastening means corresponding to fastening means 365, 490 or 505 of a removable ventilation device 375, 500 or 50.

The invention claimed is:

1. A device for cooling at least one autonomous electric power source of an aircraft, the device comprising:
    an inlet for air, the air constituting a cooling fluid,
    at least one autonomous electric power source of the aircraft towards which the air is routed,
    a convergent hot air outlet, comprising moving elements configured to control a flowrate of the air by a supervision device of the aircraft, depending on a need for cooling of the autonomous electric power source,
    wherein the convergent hot air outlet comprises an inlet, and wherein the moving elements are disposed at the inlet of the convergent hot air outlet.

2. The device according to claim 1, wherein the inlet is located in a fairing of the aircraft.

3. The device according to claim 1, wherein the inlet is located on an underside of the aircraft.

4. The device according to claim 1, wherein the autonomous electric power source comprises a battery.

5. The device according to claim 4, wherein the supervision device comprises a battery management system that controls a current, a state of charge and a temperature of the autonomous electric power source.

6. The device according to claim 1, wherein the air inlet is located on a wing of the aircraft.

7. The device according to claim 1, wherein the air inlet is protected by a grille.

8. The device according to claim 1, wherein the convergent hot air outlet comprises a convergent nozzle.

9. The device according to claim 8, wherein the convergent nozzle is configured to accelerate the air exiting the convergent nozzle to a speed closely matching an airflow speed over the fuselage.

10. The device according to claim 1, wherein the moving elements comprise a plurality of movable flaps and a plurality of actuators.

11. The device according to claim 10, wherein the autonomous electric power source is comprised of a plurality of cells and each movable flap is associated with one of said cells.

12. The device according to claim 1, wherein the supervision device comprises a microprocessor.

13. The device according to claim 1, further comprising a removable ventilation device which supplies the air inlet and wherein the air flowrate is controlled by the supervision device of the aircraft.

14. The device according to claim 13, further comprising fastening elements securing the removable ventilation device to the aircraft.

15. A method for cooling at least one autonomous electric power source of an aircraft, the method comprising the following steps:
    providing a device for cooling at least one autonomous electric power source of an aircraft comprising: an inlet for air, the air constituting a cooling fluid,
    at least one autonomous electric power source of the aircraft towards which the air is routed,
    a convergent hot air outlet, comprising moving elements configured to control a flowrate of the air by a supervision device of the aircraft, depending on a need for cooling of the autonomous electric power source,
    wherein the convergent hot air outlet comprises an inlet, and wherein the moving elements are disposed at the inlet of the convergent hot air outlet;
    cooling the air via entry of the air through the air inlet,
    feeding the cooled air towards at least one autonomous electric power source of the aircraft,
    converging hot air at the outlet,
    calculating the need for cooling of the autonomous electric power source by the supervision means of the aircraft, and
    controlling the moving elements to control the air flowrate.

16. The method for cooling according to claim 15, further comprising the following steps:
    fastening a removable ventilation device to the aircraft,
    supplying electric current to the removable ventilation device, and
    controlling the air flowrate of the ventilation device.

17. An aircraft, which comprises a device according to claim 1.

18. The device according to claim 17, further comprising a removable ventilation device which supplies the air inlet and wherein the air flowrate is controlled by the supervision device of the aircraft.

19. The device according to claim 18, further comprising fastening elements securing the removable ventilation device to the aircraft.

20. A device for cooling at least one autonomous electric power source of an aircraft, the device comprising:
    an inlet for air, the air constituting a cooling fluid,
    at least one autonomous electric power source of the aircraft towards which the air is routed in a stream,
    a convergent hot air outlet, downstream of the autonomous electric power source, comprising moving elements configured to control a flowrate of the air over the autonomous electric power source,
    a supervision device of the aircraft configured to control a position of the moving elements of the convergent hot air outlet, depending on a need for cooling of the autonomous electric power source,
    wherein the moving elements comprise a plurality of movable flaps and a plurality of actuators, and, wherein the autonomous electric power source is comprised of a plurality of cells and each movable flap is associated with one of said cells.

* * * * *